United States Patent [19]

Lo et al.

[11] Patent Number: 4,906,399

[45] Date of Patent: Mar. 6, 1990

[54] ORGANOSILICON OXYGEN BLEACH ACTIVATOR COMPOSITIONS

[75] Inventors: Sunny J. Lo, Midland; Terence J. Swihart, Bay City; Andrew H. Ward, Sanford, all of Mich.

[73] Assignee: Dow Corning Corporation, Midland, Mich.

[21] Appl. No.: 234,661

[22] Filed: Aug. 19, 1988

[51] Int. Cl.[4] .............................................. A01N 00/00

[52] U.S. Cl. .......................... 252/186.39; 252/186.38; 252/186.22; 252/186.23; 252/102; 252/95; 252/174.15; 8/111; 8/110

[58] Field of Search ....................... 252/186.39, 186.38, 252/186.41, 186.22, 186.23, 102, 174.15; 8/111

[56] References Cited

U.S. PATENT DOCUMENTS

| | | | |
|---|---|---|---|
| 3,425,786 | 2/1969 | Dithmar et al. | 8/111 |
| 3,655,567 | 4/1972 | Gray | 252/186.22 X |
| 3,840,466 | 10/1974 | Gray | 252/186.38 X |
| 3,928,223 | 12/1975 | Murray | 252/186.39 X |
| 4,192,761 | 3/1980 | Peltre et al. | 252/99 |
| 4,283,301 | 8/1981 | Diehl | 252/102 |
| 4,412,934 | 11/1983 | Chung et al. | 252/186 |
| 4,446,035 | 5/1984 | Barrat et al. | 252/102 X |
| 4,457,858 | 7/1984 | Saran et al. | 252/182 |
| 4,486,327 | 12/1984 | Murphy et al. | 252/94 |
| 4,634,551 | 1/1987 | Burns et al. | 252/186.38 X |
| 4,654,161 | 3/1987 | Kollmeier et al. | 252/174.15 |

FOREIGN PATENT DOCUMENTS

| | | |
|---|---|---|
| 0174132 | 3/1986 | European Pat. Off. . |
| 2138853 | 10/1984 | United Kingdom . |

*Primary Examiner*—Brooks H. Hunt
*Assistant Examiner*—Virginia B. Caress
*Attorney, Agent, or Firm*—Jim L. DeCesare

[57] ABSTRACT

An oxygen bleach composition which includes a peroxy bleach component selected from the group consisting of perborates, persulfates, persilicates, perphosphates, and percarbonates, and an organic oxygen bleach activator component capable of reacting with the peroxy bleach component to produce an active peroxy acid, the activator being selected from the group consisting of acetamide functional organosilicon compounds and succinimide functional organosilicon compounds. The activator is a compound selected from the group consisting of compounds having the formulas:

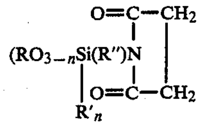

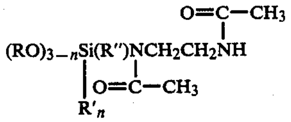

wherein

R=an alkyl group having 1–4 carbon atoms,
R'=an alkyl group having 1–4 carbon atoms,
R''=an alkylene group having 1–6 carbon atoms, and
n=0, 1, or 2.

12 Claims, No Drawings

ORGANOSILICON OXYGEN BLEACH ACTIVATOR COMPOSITIONS

BACKGROUND OF THE INVENTION

This invention relates to a new type of oxygen bleach activator for peroxy bleaches, and more particularly relates to an organosilicon compound capable of reacting with peroxy bleaches to produce active peroxy acids.

A bleach is a substance which lightens, whitens, and decolorizes a substrate through chemical activity. There are various categories of bleaches, and one of the most prevalent is the sodium hypochlorite type. Dry bleaches are also available in the form of sodium dichloroisocyanurate formulations which decompose in solution to release sodium hypochlorite. Hydrogen peroxide is still used to some extent in the bleach industry, and a growing category of bleach is sodium perborate which release hydrogen peroxide to function as the agent responsible for whitening. Color producing agents in a substrate sought to be bleached are organic compounds which contain alternating single and double bonds. These chromophores absorb visible light and transmit color. Decolorization is brought about by destroying one or more of the double bonds, and this destruction is accomplished with the bleach which destroys the double bond by adding to the double bond. In the particular case of hydrogen peroxide and peroxy bleaches such as sodium perborate, an oxygen atom is added across the double bond. In home laundering, when bleaches are employed, they are usually dispensed in a laundry liquor at a temperature of about fifty degrees Centigrade, or lower. While perborate bleaches are a less harsh alternative to chlorine bleaches, in order to be effective, it is necessary to allow an excessively long time for perborate bleaching, employ a higher temperature, or add an activator that is capable of reacting with the perborate ion to produce an active peroxy acid. Peroxy bleaches such as perborates, persulfates, persilicates, perphosphates, and percarbonates, as well as organic oxygen bleach activators capable of reacting with the peroxy bleach component to produce an active peroxy acid, are well known in the prior art. For example, some of the conventional perborate bleach activators are acyl compounds and N-acetylated compounds such as ethylenediaminetetra-acetic acid, phosphonic acid derivatives, cyanoamines, N-benzoyl-2-methylimidazole, N-acylcyano cyclic amines, sulfonyl oximes, carbodiimides, acylphosphonate, N-sulfonylazole, heterocyclic sulfonate esters, sulfonic anhydride, carboxylic-sulfonic anhydrides, and other acyl group containing compounds which react with perborate to form peroxyacetic acid. Tetra-acetylethylenediamine (TAED) and tetra-acetylglycouril (TAGU) are disclosed in each of U.S. Pat. No. 4,192,761, issued Mar. 11, 1980, and U.S. Pat. No. 4,457,858, issued July 3, 1984. In U.S. Pat. No. 4,283,301, issued Aug. 11, 1981, the bleach activator isopropenyl hexanoate is taught. Sodium octanoyloxybenezenesulfonate is used in U.S. Pat. No. 4,412,934 issued Nov. 1, 1983, and in the published unexamined European Patent Application No. 0174132-A2 of Mar. 12, 1986, whereas sodium 4-(2-chloro-octanoyloxy)benzenesulfonate is employed in U.S. Pat. No. 4,486,327, issued Dec. 4, 1984. A bleach activator and a bleach catalyst auxiliary is a concept set forth in United Kingdom published unexamined Application No. 2138853A of Oct. 31, 1984, wherein the auxiliary bleach catalyst is ferrous or ferric D-glycero-D-guloheptonate. While it is apparent from the foregoing that the prior art is replete with activators for perborate type bleach compositions, it is not believed to be known heretofore to employ an organosilicon compound in such a capacity as bleach activator. Thus, the present invention is considered to include a new category of bleach activator heretofore unknown in the prior art.

SUMMARY OF THE INVENTION

This invention relates to an oxyen bleach containing granular detergent composition including a peroxy bleach component selected from the group consisting of perborates, persulfates, persilicates, perphosphates, and percarbonates, and an organic oxygen bleach activator capable of reacting with the peroxy bleach component to produce an active peroxy acid. The improvement resides in the activator being selected from the group consisting of acetamide functional organosilicon compounds and succinimide functional organosilicon compounds.

The activator is a compound selected from the group consisting of compounds having the following formulas:

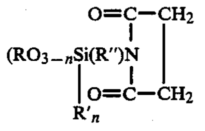

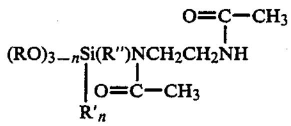

wherein

R = an alkyl group having 1–4 carbon atoms,

R' = an alkyl group having 1–4 carbon atoms,

R'' = an alkylene group having 1–6 carbon atoms, and n = 0, 1, or 2.

The invention also relates to a method of bleaching clothing in a laundry liquor comprising the steps of adding the clothing to a laundry liquor and mixing the clothing with an oxygen bleach containing composition including a peroxy bleach component selected from the group consisting of perborates, persulfates, persilicates, perphosphates, and percarbonates, to which has been added an organic oxygen bleach activator capable of reacting with the peroxy bleach component to produce in the laundry liquor an active peroxy acid, the activator being selected from the group consisting of acetamide functional organosilicon compounds and succinimide functional organosilicon compounds.

The invention further relates to an oxygen bleach composition comprising a peroxy bleach component selected from the group consisting of perborates, persulfates, persilicates, perphosphates, and percarbonates, and an organic oxygen bleach activator component capable of reacting with the peroxy bleach component to produce an active peroxy acid, the activator being selected from the group consisting of acetamide functional organosilicon compounds and succinimide functional organosilicon compounds.

The invention still further relates to a method of enhancing the bleach performance activity of an oxygen bleach composition which includes a peroxy bleach component selected from the group consisting of perborates, persulfates, persilicates, perphosphates, and percarbonates, comprising adding to the bleach an organic oxygen bleach activator which is capable of reacting with the peroxy bleach component to produce an active peroxy acid, the activator being selected from the group consisting of acetamide functional organosilicon compounds and succinimide functional organosilicon compounds.

The most preferred activators for use in accordance with the concepts of the present invention are a succinimide functional organosilicon compound having the formula:

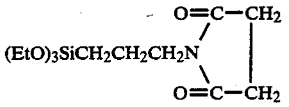

wherein Et is ethyl, and an acetamide functional organosilicon compound having the formula:

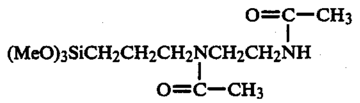

wherein Me is methyl.

It is therefore an object of the present invention to provide a new category of oxygen bleach activator compounds for peroxy bleaches and wherein the activator is an organosilicon.

These and other features, object, and advantages of the present invention will become apparent to those skilled in the art when considered in conjunction with the following detailed description of the invention.

DETAILED DESCRIPTION OF THE INVENTION

The primary categories of bleach used in household applications have been chlorine based and peroxide based compositions. The chlorine type of bleach has generally constituted either sodium hypochlorite or aqueous solutions thereof. While the chlorine based bleaches have been found to be effective, the generated chlorine has a tendency to attack the textile fibers which weakens the fibers and tends to render white fabrics brown in time. Hydrogen peroxide is not stable enough to survive compounding in liquids or powder detergents, and has not been used as a bleaching agent alone by addition to laundry batches. Unless sodium perborate is employed at elevated temperatures or used in conjunction with an additive in order to render it more effective as a bleach, it is inefficient for most laundry purposes encountered in the domestic environment. The peroxy radical is the active species in bleaching, and if the formation of this species can be enhanced, the more effective is the bleaching operation. Accordingly, and in the case of sodium perborate, bleach activators have been devised which react directly with the perborate radical to form a peroxidated species, for example peroxy acid, which disassociates more readily to form peroxy radicals which are desired for the bleaching operation. Obviously, an acid could be added directly to generate the peroxy acid, and 1,12-dodecanediperoxyacid has been used to generate percarboxylic acid, but it has been found difficult to include an acid for this purpose in the highly alkaline environment of a powder or liquid detergent formulation. Therefore, and in accordance with the present invention, a departure from the prior art has been made herein where a new type of bleach activator compound has been devised which is based on an organosilicon compound, and a compound type not known prior to this invention in the prior art. The following examples are set forth in order to illustrate the preparation and the utility of the new organosilicon bleach activator compositions of the present invention.

EXAMPLE I

A perborate bleach activator test procedure was used in order to show the efficacy as oxygen liberators of the compounds of the invention. The objective of the test was to determine the instantaneous rate of production of active oxygen and the total yield of active oxygen. Iodine generated by the active oxygen was titrated against a standardized sodium thiosulfate solution. The activator was added to a heated solution of either hydrogen peroxide or sodium perborate, and sodium iodide. Peroxy radicals were generated and reacted quantitatively with the iodide ions to form molecular iodine ($I_2$), and the iodine was titrated with sodium thiosulfate in accordance with standard iodimetric titration procedures. In the test, a beaker containing five hundred milliliters of distilled water was brought to and maintained at a constant temperature of fifty degrees Centigrade. A weighed sample of the activator compound being tested was added to the water, together with ten milliliters of one percent hydrogen peroxide. Four tenths of a gram of potassium iodide crystals were then added and a stopwatch started. The brown color characteristic of free iodine was observed and the cumulative amount of titrant used until no further iodine was generated, was recorded as a function of time. Weight activator coefficients expressed in terms of mmoles of active oxygen per gram of sample per minute were calculated by dividing the product of milliliters of titrant and titrant normality by the product of the grams of sample and the time in minutes. Molar activator coefficients are obtained by dividing the weight activator coefficients by the molecular weight of the material being tested.

In the following examples, organosilanes containing amide groups were prepared, and which compounds react with peroxy radical precursors to form peroxy acids. The preferred compounds were found to possess a degree of substitution greater than about two amide groups per silane and closer to three amide groups per silane. Acetamide and succinimide functional organosilanes were prepared for these purposes.

EXAMPLE II

One hundred-eight grams of N-(B-aminoethyl)-alpha-aminopropyltrimethoxysilane (APTS) was added to a reaction flask. This aminoalkyl-functional silane is a light straw to yellow colored liquid having a viscosity of six centistokes, a molecular weight of two hundred twenty-two, and of the formula $(CH_3O)_3SiCH_2CH_2CH_2NHCH_2CH_2NH_2$. Into the reaction flask was added twenty-five grams of acetic anhydride. The materials were mixed together, reacted, and heated for two hours at one hundred ten degrees Centigrade. The resulting material had a degree of substitution of one amide group per molecule and an activity coefficient of essentially zero.

EXAMPLE III

Example II was repeated except that the amount of acetic anhydride was doubled producing a silane with a degree of substitution of two. The resulting material had an activity coefficient of 0.7 mmoles of active oxygen per minute per gram of sample when tested in accordance with Example I, and a total yield of 1.4 mmoles of active oxygen per gram of activator.

EXAMPLE IV

Example II was repeated except that the amounts of starting materials were adjusted in order to produce a compound having a theoretical yield of three amide groups per molecule. This compound when tested in accordance with the procedures of Example I provided an activator coefficient of 1.7 at two minutes and a total yield of 7.29 mmoles of active oxygen per gram of activator. The corrected yield when taking free acid into account was found to be 6.04 mmoles of active oxygen per gram of activator.

EXAMPLE V

Example IV was repeated under milder conditions and with sodium methylate added as a catalyst. Into the reaction flask was added 54.3 grams of acetic anhydride and seventy-two grams of the silane (APTS) of Example II. The temperature of the reaction mixture was maintained below seventy degrees Centigrade throughout this exotherm, and the reaction was continued for seventy-two hours. The sample was found to have no acetic acid odor as had been the case in Example IV, and when tested in accordance with the procedure of Example I, exhibited an activator coefficient of 6.07 at forty-six seconds and a total yield of 6.2 mmoles per gram of sample.

The compounds prepared in accordance with the procedures set forth above in Example II to V are bleach activators and acetamide functional organosilicon compounds having the formula:

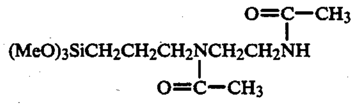

wherein Me is methyl.

EXAMPLE VI

Example V was repeated except that in place of the silane compound APTS, there was substituted a compound having the formula $(EtO)_3SiCH_2CH_2CH_2NH_2$, and in place of acetic anhydride there was employed succinic acid $HOOCCH_2CH_2COOH$. The resulting compound was found to possess a total yield of 4.53 mmoles of active oxygen per gram of sample and an activity coefficient of 2.3 at two minutes when tested in accordance with the procedures of Example I.

The compound produced in accordance with Example VI above was an oxygen bleach activator and a succinimide functional organosilicon compound having the formula:

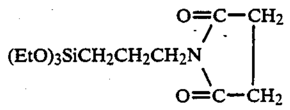

wherein Et is ethyl.

The succinimide functional silane of Example VI, it is noted, reacted more quickly to form peroxyacids than did the acetamide functional silanes of Examples II to V. However, when employed in typical washing procedures, both types of compounds rendered excellent bleaching performance, and possess the advantage that the compounds are believed to concentrate at the surface of the fabric being tested and thereby promote the generation of peroxy acids at the point where the peroxy acids are the most useful and desirable from a bleach effectiveness standpoint. Thus, when bleaching standard stains with the compounds of the present invention, the silanes are believed to preferentially form the peroxyacid at the textile surface.

In order to show the effectiveness of the compounds of the present invention in comparison to standard bleach activator compositions of the prior art, the silane of Example V was tested in accordance with the procedure of Example I and the results compared with data obtained employing the conventional activator TAED (tetra-acetyethylenediamine) which activator was also tested in accordance with the procedure of Example I. The data is tabulated below in Table I and it will be seen that the compounds of the present invention are at least comparable as oxygen active peroxy bleach activators.

TABLE I

| Time(sec) | ml[a] | Activity Coefficient (mmoles/gm/min) | Sample Weight TAED |
|---|---|---|---|
| 17 | 1.0 | 6.1811 | 0.571 |
| 43 | 2.4 | 5.8648 | 0.571 |
| 80 | 3.0 | 3.9404 | 0.571 |
| 110 | 3.2 | 3.0568 | 0.571 |
| 182 | 3.4 | 1.9630 | 0.571 |
| 346 | 3.6 | 1.0933 | 0.571 |
| | | | Ex. 5 |
| 15 | 0.8 | 5.5172 | 0.58 |
| 46 | 2.7 | 6.0719 | 0.58 |
| 69 | 3.2 | 4.7976 | 0.58 |
| 130 | 3.6 | 2.8647 | 0.58 |

[a]thiosulfate

While the inventon has been described above in terms of perborate peroxy bleach materials, it should be apparent that other bleach materials can be used, for example, persulfates, persilicates, perphosphates, percarbonates, and other inorganic or organic peroxy bleaching agents. Such materials in conjunction with the compounds of the present invention are particularly adapted for incorporation into a detergent formulation, or may be used separately thereof. When used in conjunction with a detergent formulation, however, the aforementioned patents include detergent compositions with which the compounds of the present invention would be most compatible, and the teachings thereof in this regard should be considered incorporated herein by reference. In addition, the compounds of the present invention are not limited to organosilanes but are intended to include cyclosiloxanes, linear siloxanes, high molecular weight siloxanes, and other hydrolyzable siloxanes, each including the appropriate acetamide or succinimide functional groups. In addition to the function of the compounds of the present invention as oxygen bleach activators, it has been found that the compounds tend to have a softening effect on clothing and improve their brightness characteristics, as well as producing active oxygen for bleaching. This is in addition to primary roles of increasing rates of peracid release, improving the efficiency of acid conversion to the peracid, and concentrating oxygen at the surface of the clothing. Further, the compounds of the present invention readily perhydrolyze under alkaline conditions yielding a peracid, are effective at forty degrees Centigrade, operate at low bleach to activator concentrations, are compatible with many detergents and detergent ingredients such as enzymes, and have long term shelf stability.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. In an oxygen bleach containing granular detergent composition including a peroxy bleach component selected from the group consisting of perborates, persulfates, persilicates, perphosphates, and percarbonates, and an organic oxygen bleach activator capable of reacting with the peroxy bleach component to produce an active peroxy acid, the improvement wherein the activator is selected from the group consisting of acetamide functional organosilicon compounds and succinimide functional organosilicon compounds, the activator being a compound selected from the group consisting of compounds having the formulas:

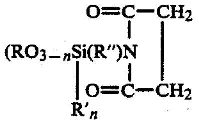

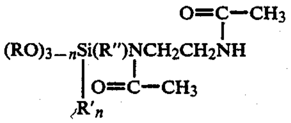

wherein

R=an alkyl group having 1–4 carbon atoms,

R'=an alkyl group having 1–4 carbon atoms,

R"=an alkylene group having 1–6 carbon atoms, and n=0, 1, or 2.

2. The detergent composition of claim 1 wherein the activator is a succinimide functional organosilicon compound having the formula:

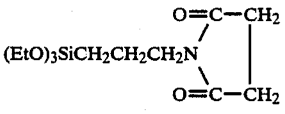

wherein Et is ethyl.

3. The detergent composition of claim 1 wherein the activator is an acetamide functional organosilicon compound having the formula:

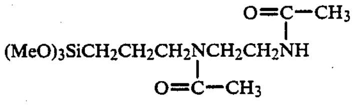

wherein Me is methyl.

4. The method of bleaching textiles in a laundry liquor comprising adding to a laundry liquor an oxygen bleach containing composition including a peroxy bleach component selected from the group consisting of perborates, persulfates, persilicates, perphosphates, and percarbonates, adding an organic oxygen bleach activator capable of reacting with the peroxy bleach component to produce in the laundry liquor an active peroxy acid, the activator being selected from the group consisting of acetamide functional organosilicon compounds and succinimide functional organosilicon compounds, adding and mixing the textiles in the laundry liquor, the activator being a compound selected from the group consisting of compounds having the formulas:

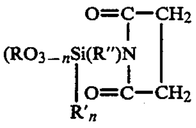

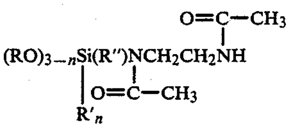

wherein

R=an alkyl group having 1–4 carbon atoms,

R'=an alkyl group having 1–4 carbon atoms,

R"=an alkylene group having 1–6 carbon atoms, and

N=0, 1, or 2.

5. The method of claim 4 wherein the activator is a compound having the formula:

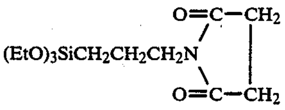

wherein Et is ethyl.

6. The method of claim 4 wherein the activator is a compound having the formula:

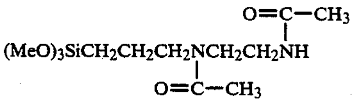

wherein Me is methyl.

7. An oxygen bleach composition comprising a peroxy bleach component selected from the group consisting of perborates, persulfates, persilicates, perphosphates, and percarbonates, and an organic oxygen bleach activator component capable of reacting with the peroxy bleach component to produce an active peroxy acid, the activator being selected from the group consisting of acetamide functional organosilicon compounds and succinimide functional organosilicon compounds, the activator being a compound selected from the group consisting of compounds having the formulas:

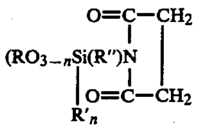

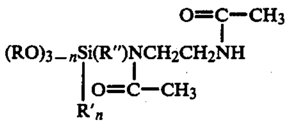

wherein

R=an alkyl group having 1-4 carbon atoms,

R'=an alkyl group having 1-4 carbon atoms,

R"=an alkylene group having 1-6 carbon atoms, and n=0, 1, or 2.

8. The bleach of claim 7 wherein the activator is a compound having the formula:

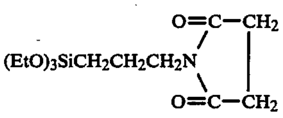

wherein Et is ethyl.

9. The bleach of claim 7 wherein the activator is a compound having the formula:

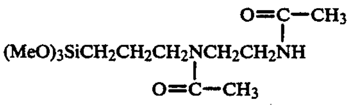

wherein Me is methyl.

10. The method of enhancing the bleach performance activity of an oxygen bleach composition which includes a peroxy bleach component selected from the group consisting of perborates, persulfates, persilicates, perphosphates, and percarbonates, comprising adding to the bleach an organic oxygen bleach activator which is capable of reacting with the peroxy bleach component to produce an active peroxy acid, the activator being selected from the group consisting of acetamide functional organosilicon compounds and succinimide functional organosilicon compounds, the activator being a compound selected from the group consisting of compounds having the formulas:

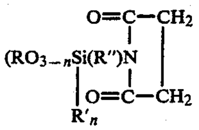

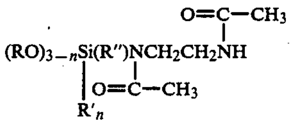

wherein

R=an alkyl group having 1-4 carbon atoms,

R'=an alkyl group having 1-4 carbon atoms,

R"=an alkylene group having 1-6 carbon atoms, and n=0, 1, or 2.

11. The method of claim 10 wherein the activator is a compound having the formula:

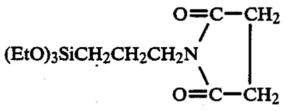

wherein Et is ethyl.

12. The method of claim 10 wherein the activator is a compound having the formula:

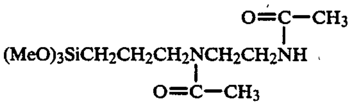

wherein Me is methyl.

* * * * *